United States Patent [19]

Lee et al.

[11] Patent Number: 5,331,179

[45] Date of Patent: * Jul. 19, 1994

[54] METHOD AND APPARATUS FOR ACQUIRING AN X-RAY IMAGE USING A THIN FILM TRANSISTOR ARRAY

[75] Inventors: Denny L. Y. Lee, West Chester, Pa.; Lothar S. Jeromin, Newark, Del.

[73] Assignee: E. I. Du Pont de Nemours and Company, Wilmington, Del.

[*] Notice: The portion of the term of this patent subsequent to May 17, 2011 has been disclaimed.

[21] Appl. No.: 44,428

[22] Filed: Apr. 7, 1993

[51] Int. Cl.$^5$ ............................................. G01N 23/04
[52] U.S. Cl. ................................................... 250/591
[58] Field of Search ............................ 250/591, 370.09; 378/38

[56] References Cited

U.S. PATENT DOCUMENTS

| | | | |
|---|---|---|---|
| 2,866,903 | 12/1958 | Berchtold | 378/28 |
| 3,748,380 | 7/1973 | Kohashi | 358/111 |
| 3,973,146 | 8/1976 | Arnold et al. | 357/26 |
| 4,030,922 | 6/1977 | Honjo et al. | 378/28 |
| 4,085,327 | 4/1978 | Swank et al. | 250/591 |
| 4,134,137 | 1/1979 | Jacobs et al. | 358/293 |
| 4,176,275 | 11/1979 | Korn et al. | 250/213 R |
| 4,268,750 | 5/1981 | Cowart | 250/315.1 |
| 4,446,365 | 5/1984 | Ong et al. | 250/213 R |
| 4,508,966 | 4/1985 | Oberschmid et al. | 250/327.2 |
| 4,521,808 | 6/1985 | Ong et al. | 358/111 |
| 4,535,468 | 8/1985 | Kempter | 378/31 |
| 4,539,591 | 9/1985 | Zermeno et al. | 358/335 |
| 4,554,453 | 11/1985 | Feight et al. | 250/327.2 |
| 4,663,526 | 5/1987 | Kamieniecki | 250/315.3 |
| 4,670,765 | 6/1987 | Nakamura et al. | 357/30 |
| 4,694,317 | 9/1987 | Higashi et al. | 357/30 |
| 4,818,857 | 4/1989 | Micheron | 250/213 R |
| 4,857,723 | 8/1989 | Modisette | 250/591 |
| 4,961,209 | 10/1990 | Rowlands | 378/29 |
| 4,975,935 | 12/1990 | Hillen et al. | 378/28 |
| 5,127,038 | 6/1992 | Jeromin et al. | 378/28 |
| 5,182,624 | 1/1993 | Tran et al. | 257/40 |

FOREIGN PATENT DOCUMENTS 0125691 11/1984 European Pat. Off. .
63-3454 1/1988 Japan .

OTHER PUBLICATIONS

L. E. Antonuk et al, "Development of Hydrogenated Amorphous Silicon Sensors for High Energy Photon Radiotherapy Imaging," IEEE Transactions on Nuclear Science, vol. 37, No. 2, Apr. 1990.

L. E. Antonuk et al., "Signal, Noise, and Readout Considerations in the Development of Amorphous Silicon Photodiode Arrays for Radiotherapy and Diagnostic X-ray Imaging" SPIE Medical Imaging V: Image Physics, vol. 1443, 108-119, 25-26 Feb. 1991.

E. B. Lipscomb, III, Section 11-12, vol. 3, 1985, "Lipscomb's Walker on Patents", 3rd edition, The Lawyers Co-operative Pub. Co., Rochester, N.Y.

L. E. Antonuk et al., "Development of Thin Film, Flat Panel Arrays for Diagnostic and Radiotherapy Imaging," Conference Proceedings of SPIE Medical Imaging VI, Feb. 23-27, 1992, Newport Beach, Calif.

L. E. Antonuk et al., "Large Area Amorphous Silicon Photodiode Arrays for Radiotherapy and Diagnostic Imaging," Nuclear Instruments and Methods in Physics Research A310 (1991) pp. 460-464.

L. E. Antonuk et al., "Development of Hydrogenated Amorphous Silicon Sensors for Diagnostic X-rays Imaging," IEEE Transactions on Nuclear Science, vol. 38, No. 2, Apr. 1991.

Primary Examiner—Carolyn E. Fields

[57] ABSTRACT

The present invention relates to an X-ray image capturing element comprising a panel having a layered structure, including a conductive layer comprising a plurality of discrete microplates having dimensions coextensive with an image pixel and a plurality of access electrodes and electronic components built on the panel, which allow access to the microplates for capturing and reading out a latent radiographic image captured in the panel in the form of stored electrical charges.

12 Claims, 8 Drawing Sheets

METHOD AND APPARATUS FOR ACQUIRING AN X-RAY IMAGE USING A THIN FILM TRANSISTOR ARRAY

BACKGROUND OF THE INVENTION

1. Field of the Invention

The present invention relates to a method and apparatus for capturing digital radiographic images. More particularly, the present invention relates to a method and associated apparatus for capturing and readout of electrical charges representing a latent radiographic image in a unique microcapacitor matrix panel to obtain an electrical signal representing a radiogram.

2. Description of the Related Art

Traditional radiography employs a silver halide photosensitive film in a light tight cassette enclosure, to capture a latent radiographic image, which is subsequently rendered visible following chemical development and fixing. Because silver halide film is not very sensitive to X-ray radiation, and large exposures are required to obtain an image, most applications use a combination of an intensifying screen comprising a phosphor layer, with the silver halide film to achieve lower exposures.

Radiograms have also been produced by capturing a latent radiographic image using a photoconductive plate in a xeroradiographic process. In this instance, a photoconductive plate sensitive to X-ray radiation comprising at least a photoconductive layer coated over a conductive backing layer is first charged by passing under a charging station typically comprising a corona wire. Positive or negative charge is uniformly deposited over the plate surface. The plate is next exposed to X-ray radiation. Depending on the intensity of the incident radiation, electron hole pairs generated by the X-ray radiation are separated by a field incident to the charge laid over the surface and move along the field to recombine with the surface charge. After X-ray exposure, a latent image in the form of electrical charges of varying magnitude remain on the plate surface, representing a latent electrostatic radiogram. This latent image may then be rendered visible by toning and preferably transferring onto a receiving surface for better viewing.

More recent developments include the use of an electrostatic image capture element to capture a latent X-ray image, the element comprising a photoconductive layer over an insulating layer on a conductive support, the photoconductive layer also covered by a dielectric layer, and the dielectric layer overcoated with a transparent electrode. A biasing voltage is applied between the transparent electrode and the conductive support to charge the element which is a large parallel plate capacitor. While the bias voltage is applied, the element is exposed to image wise modulated X-ray radiation. Following exposure, the bias is removed and a latent image is preserved as a charge distribution stored across the dielectric layer. The problem with this element structure is that the latent image represented by local charge variations is a very small signal charge that must be extracted in the presence of random noise in the total capacitive charge in the full plate. Signal to noise ratio is typically poor.

In an effort to improve the signal to noise ratio, the transparent electrode is laid over the dielectric layer as a plurality of pixel size microplates having an area commensurate with the area of the smallest resolvable element in the image. In this manner, the overall plate capacity is reduced and the signal extracted per picture element has a better signal to noise ratio. Methods to readout the latent image include, inter alia, scanning the length of the strip electrode with a laser beam while reading the charge flow from each of the microcapacitors formed between the microplates and the conductive plate. While this element is a vast improvement over the continuous electrode structure covering the full plate, the mode of use of this plate is somewhat complex particularly with respect to the manner in which the original charging of the microplates occurs.

SUMMARY OF THE INVENTION

The invention relates to an X-ray image capture element, comprising:

a first, electrically conductive backing layer;

a second, photoconductive layer responsive to both actinic and X-ray radiation extending substantially over said backing layer having a back surface in contact with said backing layer and a front surface opposite said back surface;

a third, dielectric layer substantially transparent to both actinic and X-ray radiation, the dielectric layer also having a back surface and a front surface, the dielectric back surface extending substantially over and in contact with said front surface of the photoconductive layer;

a plurality of discrete conductive outer microplates substantially transparent to both actinic and X-ray radiation, said outer microplates arranged on said front surface of the dielectric layer with a space between adjacent microplates, each of said outer microplates having dimensions coextensive with a minimum resolvable picture element;

a first plurality of discrete conductive $X_n$ address lines extending along the outer microplates;

a second plurality of discrete conductive $Y_n$ sense lines extending along said outer microplates in a direction across said $X_n$ address lines; and each outer microplate being connected to one adjacent of said plurality of $X_n$ address and $Y_n$ sense lines via at least one transistor.

The element may further comprise a conductive grid under the dielectric layer extending over the front surface of the photoconductive layer and in contact therewith, aligned in the spaces outside the areas covered by the outer microplates, generally under the $X_n$ and $Y_n$ lines.

In a preferred structure, the element may comprise in addition to the aforementioned grid, a plurality of discrete conductive inner microplates substantially transparent to both actinic and X-ray radiation, said plurality of inner microplates arranged on said front surface of the photoconductive layer and in contact therewith, each of said inner microplates also having dimensions coextensive with a minimum resolvable picture element, the inner microplates aligned substantially underneath the outer microplates.

The element may include means for switching said plurality of $X_n$ and $Y_n$ lines each from a first charge state to a second readout state, and means to electrically access the grid from the outside and for selectively connecting the grid to the backing plate.

The present invention is further directed to a method for capturing a radiogram on an X-ray image capture element of a type, comprising:

a first, electrically conductive, backing layer;

a second, photoconductive layer responsive to both actinic and X-ray radiation extending substantially over said backing layer;

a third, dielectric layer substantially transparent to both actinic and X-ray radiation, the dielectric layer having a back surface extending substantially over and in contact with said photoconductive layer and a front surface;

a plurality of discrete conductive microplates substantially transparent to both actinic and X-ray radiation, said microplates arranged on said front surface with a space between adjacent microplates, each of said microplates having dimensions coextensive with a minimum resolvable picture element, the microplates dielectric, photoconductor and back plate forming a plurality of microcapacitors;

a first plurality of discrete conductive Xn address lines extending along the microplates;

a second plurality of discrete conductive Yn sense lines extending along said microplates in a direction across said Xn address lines; and each microplate being connected to one adjacent of said plurality of said Xn and Yn lines via a transistor, the method comprising:

(a) preventing actinic radiation from impinging on said element;

(b) switching the pluralities of Xn and Yn lines to a first charging position and applying a bias voltage through the transistors simultaneously to all the microplates to develop an electric potential difference between said plurality of discrete conductive microplates and said backing layer;

(c) impinging imagewise modulated X-ray radiation for a first time period onto the element;

(d) after the first time period, stopping the applying of the bias voltage to trap in the microcapacitors electrical charges proportional to the intensity of the impinging radiation on the microplates;

(e) switching the plurality of the Xn and Yn lines to a second readout position;

(f) optionally exposing the element to uniform radiation for a second time period;

(g) while exposing the panel to actinic radiation, addressing one of said plurality of Xn lines with a trigger voltage to switch to a conductive state the transistors connecting the addressed Xn line to a plurality of microplates and to connect said microplates to the Yn lines;

(h) sequentially detecting an output signal for each microplate connected to said addressed plurality of Yn sense lines; and (i) repeating steps (g) and (h) for each of said plurality of Xn or Yn address lines until all signals from all microplates have been detected.

Steps (d) and (e) may be combined.

In order to completely discharge the element after image readout and prior to a new image capture, the following additional steps are employed:

(j) electrically interconnecting all Xn address lines and all Yn sense lines; and (k) while applying a bias voltage to the Xn address lines, rendering all the transistors to an "on⇌ stage, flooding the element with actinic radiation and electrically connecting the output of the Yn sense lines to the backing plate.

The method for capturing a radiogram on an X-ray image capture element is also applicable, in instances wherein the X-ray capturing panel further comprises a conductive grid under the dielectric layer extending over the front surface of the photoconductive layer aligned in the spaces outside the areas covered by the outer microplates, generally under the plurality of Xn and Yn lines, in contact with the surface of the photoconductive layer and accessible from outside the panel. The method is also applicable in instances where in addition to the grid there are a plurality of inner microplates located under the dielectric layer on the front surface of the photoconductive layer and in contact therewith, aligned substantially under the plurality of outer microplates. In these cases however, following step (e) the conductive grid is electrically connected to the first electrically conductive backing layer.

BRIEF DESCRIPTION OF THE DRAWINGS

The invention can be more fully understood from the following detailed description thereof in connection with the accompanying drawings described as follows.

DETAILED DESCRIPTION OF THE PREFERRED EMBODIMENTS

Throughout the following detailed description, similar reference characters refer to similar elements in all figures of the drawings.

Figure 1:
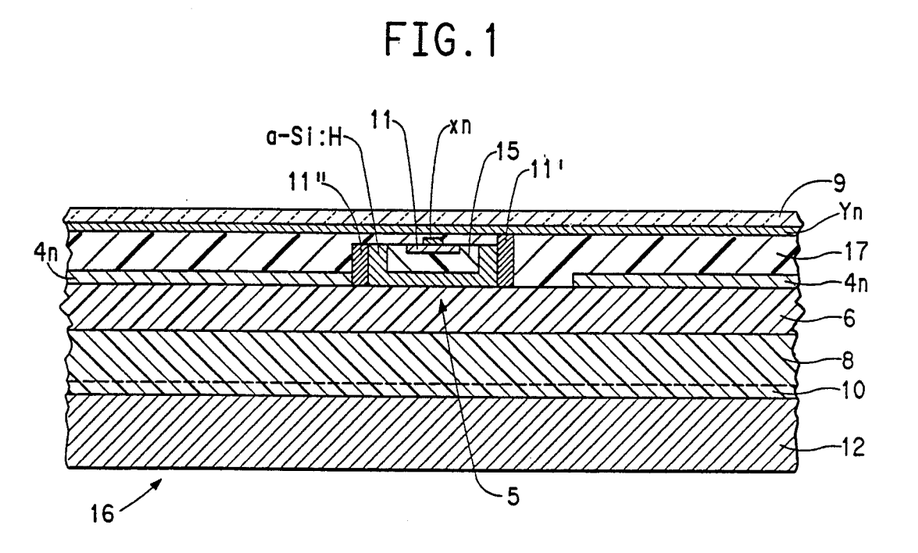
FIG. 1 shows a schematic cross sectional elevation view of an X-ray capture element in accordance with the present invention.

Referring to FIG. 1, an X-ray image capture apparatus, element or panel 16 is depicted having a first conductive backing layer 12. This conductive backing layer 12 is made of conductive material, and may be rigid or flexible, transparent or non-transparent. Preferably, it is a continuous layer made of a sufficiently thick and rigid conductive material to serve as support for other layers included in the image capture element 16. In its simpler structure, there is coated over the conductive backing layer 12 a photoconductive layer 8 having a back surface in contact with the conductive backing layer 12, and a front surface. The photoconductive layer 8 preferably exhibits very high dark resistivity.

The photoconductive layer 8 may comprise amorphous selenium, lead oxide, cachnium sulfide, mercuric iodide or any other such material, including organic materials such as photoconductive polymers preferably loaded with X-ray absorbing compounds, which exhibit photoconductivity.

In the context of the present invention, exhibiting photoconductivity means that upon exposure to actinic or X-ray radiation, the material exhibits reduced resistivity than in the absence of such exposure. The reduced resistivity is in reality the effect of electron hole pairs generated in the material by the incident radiation. Preferably, the change in apparent resistivity is proportional to the intensity of the incident radiation. By actinic radiation, again for purposes of describing the present invention, is meant ultraviolet (U.V.), infrared (I.R.), visible, or gamma-radiation but excludes X-ray radiation.

The photoconductive layer 8 should be chosen of sufficient thickness to absorb the incident X-ray radiation, or a substantial portion thereof, to provide high efficiency in radiation detection. The specific type of material selected will further depend upon the desired charge retention time, and the desired simplicity of manufacture. Selenium is one preferred such material.

Over the front surface of photoconductive layer 8 there is applied a dielectric layer 6. The dielectric layer 6 must be transparent to both X-ray and actinic radiation and have sufficient thickness to prevent charge leakage. In the preferred embodiment of the present invention, dielectric layer 6 should have a thickness greater than 100 Angstroms. Mylar ® (i.e., polyethylene terephthalate) sheeting, with a thickness of 50 micrometers may be used for layer 6, although thinner layers are suitable.

Figure 2:
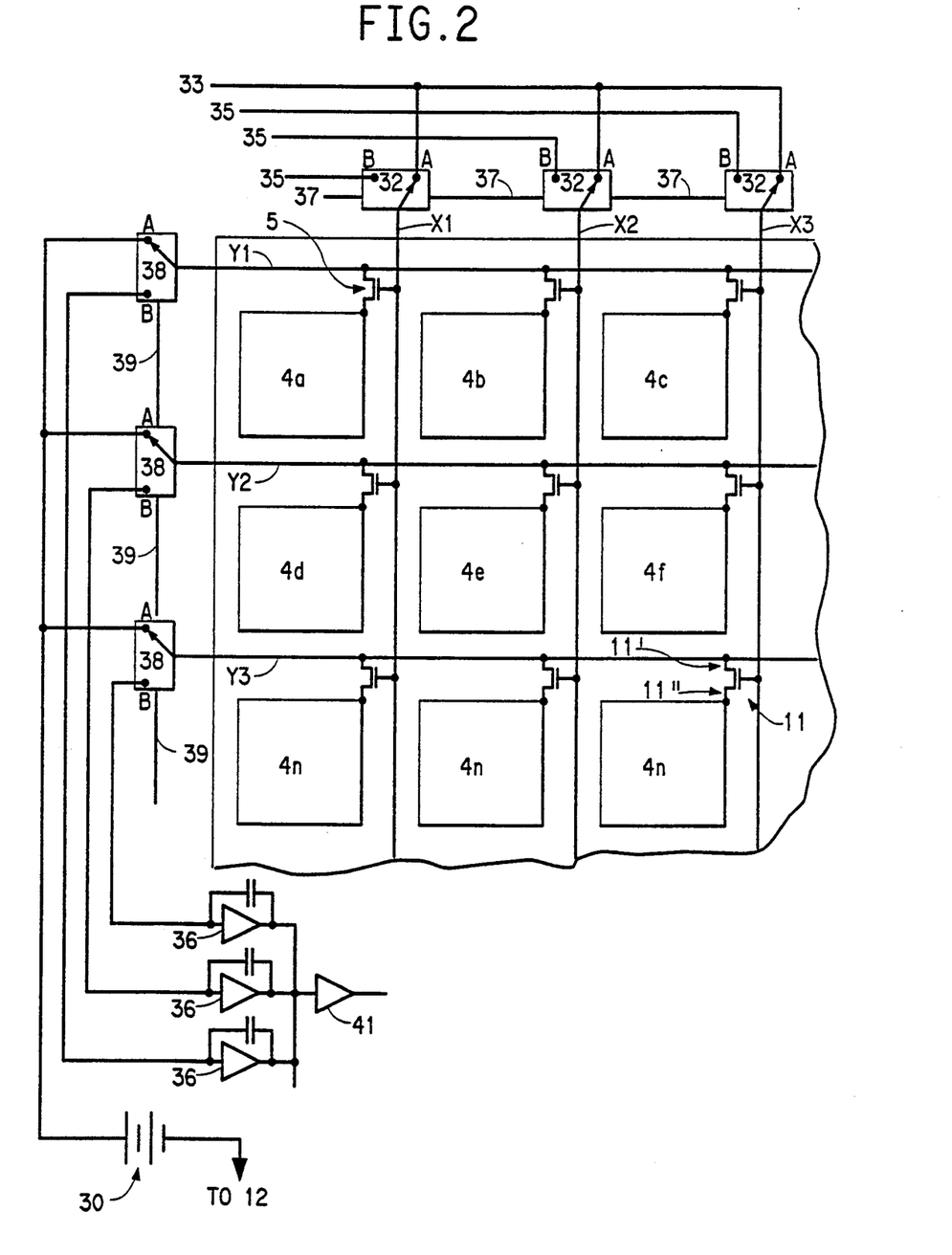
FIG. 2 is a schematic top view of the embodiment of the X-ray capture element shown in FIG. 1.

As better shown in FIG. 2, over the dielectric layer 6 there is created a plurality of discrete minute conductive electrodes 4 (i.e., 4a, 4b, 4c, . . . 4n) referred to herein as outer microplates 4. The dimensions of the outer microplates 4 define the smallest picture element (PIXEL) resolvable by the element 16. The outer microplates 4 are substantially transparent to both actinic and X-ray radiation. They are deposited on dielectric layer 6, typically, though not necessarily, using vapor or chemical deposition techniques and can be made of a very thin film of metal such as gold, silver, aluminum, copper, chromium, titanium, platinum and the like. Preferably, the outer microplates 4 are made of transparent indium-tin oxide. The outer microplates 4 may be deposited as a continuous layer which is then etched to produce a plurality of individual discrete microplates 4 having dimensions coextensive with a smallest resolvable picture element. The microplates 4 may also be produced using laser ablation or photoetching. The technology to produce such microplates 4 is well known in the art and is not further discussed herein. A good description of photomicrofabrication techniques is given in Imaging Processing & Material, Chapter 18, entitled "Imaging for Microfabrication," by J. M. Shaw of IBM Watson Research Center.

Each one of the outer microplates 4a, 4b, 4c, . . . 4n with the intermediate dielectric layer 6, the photoconductive layer 8, and the backing conductive layer 12 form two microcapacitors in series, a first microcapacitor being created between the microplate 4 and the front surface of the photoconductive layer 8 and a second microcapacitor between that same surface and the conductive backing layer 12.

An optional charge barrier layer 10 (the top surface of which is shown by a dashed line in FIG. 1) may be added on top of conductive layer 12. Preferably, base plate or layer 12 is made of an oxide forming metal such as aluminum. The charge barrier layer 10 is provided by an aluminum oxide layer formed on the surface of backing layer 12. In this case, the subsequent coating thereon of a selenium photoconductive layer 8 produces a barrier layer behaving as a blocking diode, inhibiting charge flow in one direction.

The charge barrier layer 10 may also be a simple insulating layer, such as polyethylene terephthalate, of dimensions comparable to the dielectric layer 6.

In the spaces between the microplates 4a, 4b, 4c . . . 4n, conductive electrodes or address lines X1, X2, . . . Xn and conductive electrodes or sense lines Y1, Y2, ... Yn are laid out. The Xn and Yn lines are shown laid out generally orthogonally to each other in the spaces between the outer microplates 4. The orientation of the Xn and Yn lines is a matter of choice. The Xn and Yn lines are individually accessible through leads or connectors not specifically illustrated in the drawings, along the sides or edges of the panel 16.

For fabrication purposes, the Xn and Yn lines may be constructed from the same indium tin oxide layer used for fabricating the outer microplates 4, and produced during the aforementioned etching which may be used to make the microplates 4. Since the Xn and Yn lines must not electrically contact each other where they cross over, the Yn lines may be created after placing an insulating layer 17 over the Xn lines. The reverse is of course also possible.

Figure 3:
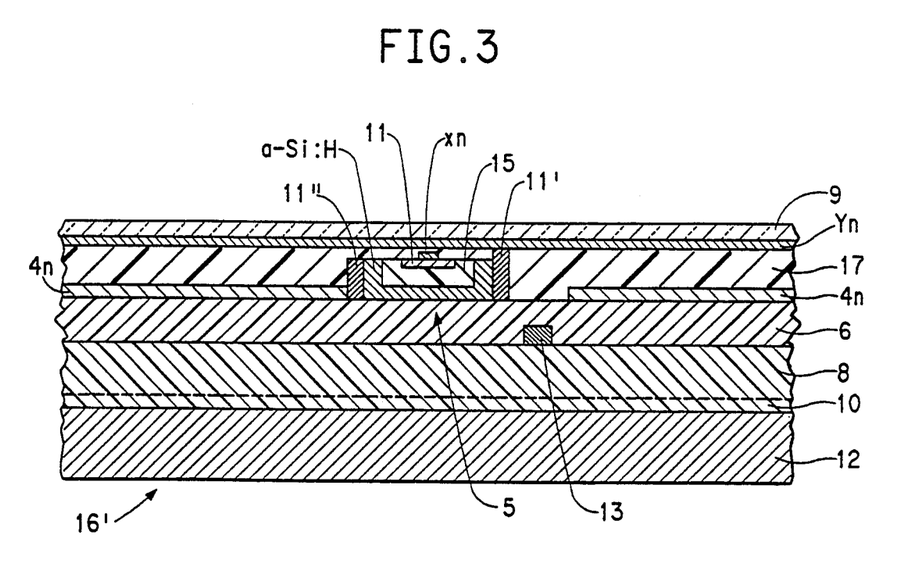
FIG. 3 shows a schematic cross sectional elevation view of an alternate embodiment of an X-ray capture element in accordance with the present invention which includes a conductive grid under a dielectric layer.
Figure 5:
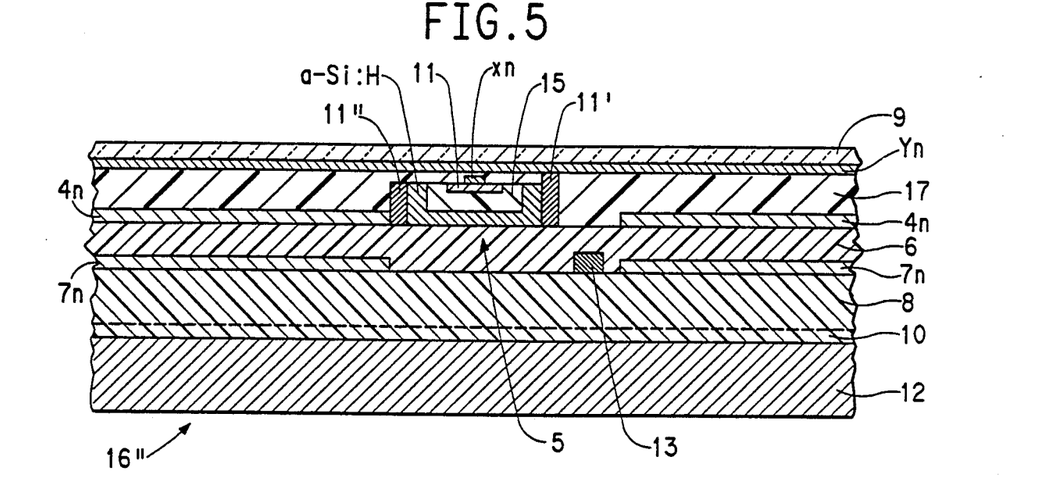
FIG. 5 shows a schematic cross sectional elevation view of yet another embodiment of an X-ray capture element in accordance with the present invention which includes a plurality of inner microplates and a conductive grid under a dielectric layer.

Connecting each outer microplate 4n to an Xn line is at least one transistor 5, typically an FET transistor 5 having its gate connected to an Xn line and its source and drain connected to an outer microplate 4 and a Yn line respectively. The FET transistor 5 serves as a bidirectional switch allowing current flow between the Yn sense lines and the outer microplates 4 depending on whether a trigger voltage is applied to its gate through address lines Xn. The FET transistor 5 may comprise a hydrogenated amorphous silicon (a-Si:H) layer, an insulating layer 15 and conductive electrodes 11, 11' and 11" forming the gate, drain and source, respectively, as schematically depicted in FIGS. 1, 3 and 5. The technology for the creation of the FET transistors 5 is well known in the art and not a subject of the present invention. See, for instance, "Modular Series on Solid Devices," Volume 5 of Introduction to Microelectronics Fabrication by R. C. Jaeger, Published by Addison-Wesley in 1988.

A final cover layer 9 which is a dielectric and can be a glass or similar protective panel may optionally be provided over the microplates 4, FETs 5, and conductive lines Xn, Yn to provide protection to the various components and ease of handling.

FIG. 3 shows an alternate embodiment of an X-ray capturing element or panel 16' in accordance with the present invention in schematic elevation cross-section. The panel 16' again comprises a conductive support or layer 12 having optional barrier layer 10 thereon. A photoconductive layer 8 is coated over the conductive layer 12 or the optional barrier layer 10 as the case may be. Over the surface of the photoconductive layer 8, there is created an electrically conductive grid 13 of orthogonal Conductive lines or parallel lines which are connected at one end. The grid 13 spacings are preferably such that the grid 13 is laid in the spaces that correspond to spaces between the outer microplates 4. The conductors forming the grid 13 run substantially along the directions of the Xn and Yn lines. The grid 13 is constructed using the same technology referred to above in the creation of the outer microplates 4 and the Xn and Yn lines and is electrically in contact with the front surface of the photoconductive layer 8.

As in the structure described above in conjunction with the description of FIG. 1, there is coated an insulating layer 6 over the grid 13 and photoconductive layer 8. A plurality of conductive outer microplates 4a, 4b, 4c, . . . 4n are again created over the insulating layer 6 the same as before.

FIG. 5 shows yet another panel 16'', in which a second plurality of conductive inner microplates 7n is placed in the spaces in the grid openings, aligned below the outer microplates 4 and coextensive therewith. The inner microplates 7n are not connected to each other or to the grid 13 but are in contact with the front surface of the photoconductive layer 8.

The entire element 16, 16' or 16'' can be made by depositing successive layers of conductor, insulator, photoconductor, insulator, and conductor upon a substrate. The FETs 5 are built in the spaces between the microplates 4 on the dielectric layer 6. Assembly may be accomplished by ion implantation, vapor deposition, vacuum deposition, lamination, sputtering or any other known technique useful to deposit even thickness films.

In practice, such a panel 16, 16' or 16'' as herein described may be readily fabricated beginning with a commercially available thin film transistor panel that comprises the cover layer 9, the outer microplates 4, transistors 5 and Xn and Yn lines. These commercially available panels are used in making liquid crystal displays, and are a convenient starting point for building the panel 16, 16' or 16'' in accordance with the disclosures herein. The dielectric layer 6 may then be coated on an open side of such a panel, i.e., over the outer microplates 4 and the Xn and Yn lines. The photoconductive layer 8 may then be coated over the dielectric layer 6. Finally a conductive layer 12 is deposited on the photoconductive layer 8 with or without an intermediate blocking layer 10 to complete the panel 16. The grid 13 and inner microplates 7n may be created over the dielectric layer 6 prior to coating the photoconductive layer 8.

In the preferred embodiment, the conductive backing layer 12, the charge barrier layer 10, the photoconductive layer 8 and the dielectric layer 6 are all continuous layers. However, it is still within the contemplation of the present invention to manufacture an element for X-ray capture as herein above structured, in which one or more of the layers underlying the outer microplates 4 may also be etched to form a plurality of discrete dielectric portions, photoconductive portions, barrier layer portions or conductive portions lying below the microplates 4 in registration therewith. Furthermore, rather than etching a continuous layer to generate the microplates 4, direct deposition of the microplates 4 using masking techniques may be used, the method of manufacturing being one of choice depending on available resources and cost considerations rather than an essential element of the present invention.

Figure 4:
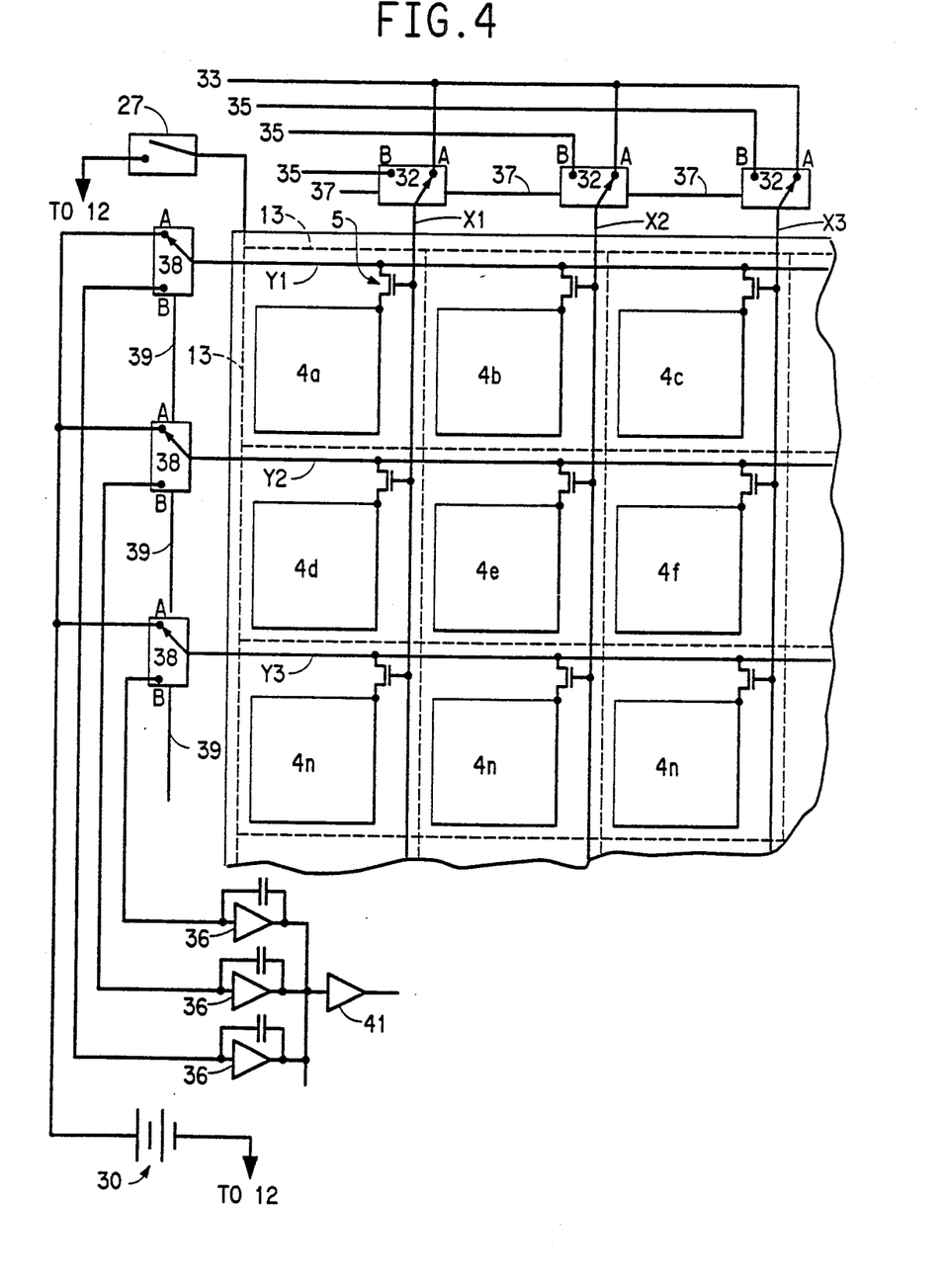
FIG. 4 is a schematic top view of the embodiment of the X-ray capture element shown in FIG. 3.

As better shown in FIGS. 2 and 4, the Xn and Yn lines terminate to a switching means comprising a first plurality of switches 32 and a second plurality of switches 38. These switches 32,38 allow switching the Xn, Yn lines to a first, A, and a second, B, position. Preferably, the switching means comprises electronically addressable solid state switches which may be either external or integral with the panel 16, 16' or 16''. When the Xn address lines are switched to the first position, a trigger voltage is applied over line 33 to all Xn lines simultaneously, and through the Xn lines to the gates of all the FET transistors 5 switching the transistors 5 to a conductive state allowing current to flow between source and drain. When the Yn sense lines are switched to the first position, they are all interconnected and also connected to a DC bias voltage source 30 for applying a DC bias voltage between the Yn lines and the backing plate or layer 12. With the Xn lines switched to the first position and the Yn lines switched to the first position, the bias voltage 30 is applied to all the outer microplates 4.

When the switches 32 are in the second position, lines Xn are independently addressable over lines 35 and no longer interconnected. Means not shown are available to effectuate such sequential switching. Such means are well known in the art and not of particular importance to this invention, as any convenient switching arrangement may be selected without altering the scope of this invention. The switches 32 and 38 may be controlled over lines 37 and 39, respectively.

When switches 38 are in the second position, lines Yn are no longer interconnected and the output of lines Yn are directed to a plurality of charge detectors 36. Each charge detector 36 is connected to a Yn line.

The charge detectors 36 may comprise an operational amplifier wired to measure the charge in a capacitive circuit into which the charge from the microcapacitors is directed, and which produces a voltage output proportional to such charge. The output of charge detectors 36 may be sampled sequentially to obtain an output signal and the technology to do this is also well known in the art.

Figure 6:
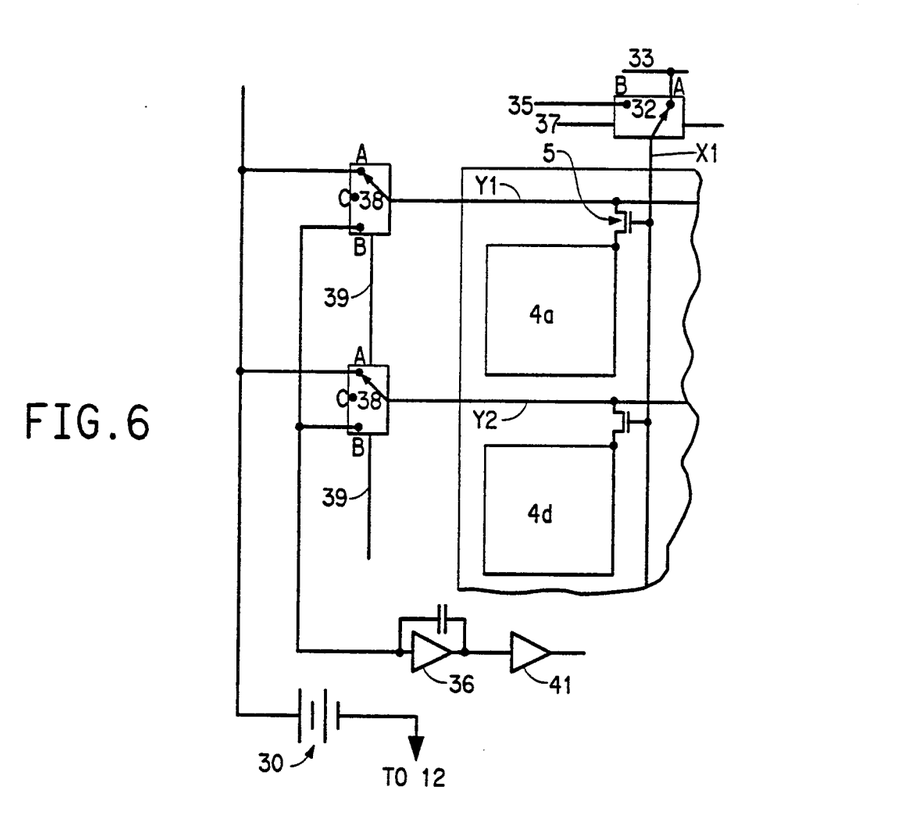
FIG. 6 shows an a panel in accordance with this invention wherein Yn sense lines are directed to a three way switch.

It is also possible to use a single charge detector with a sampling network arranged so as to sequentially apply the output of the Yn lines to the single detector input, as shown in FIG. 6. In this case, switches 38 may be provided with three positions having in addition to the two positions described above a third, standby position which does not connect the Yn lines to anything. Switches 38 are normally at the third position, and shift to the first or second position when addressed through line 39. Means not illustrated are provided for addressing the switches 38 to sequentially and individually switch over to the second position and connect the lines Yn to an input of the single charge detector 36. The switches 38 each return to the third position before the next switch is addressed.

In the case of the panel 16, 16' or 16'' depicted in FIGS. 3 and 5, in addition to the circuitry discussed above connected to the panel 16, 16' or 16" and lines Xn and Yn addressing means discussed above, there is an additional connection provided for accessing the conductive grid 13. Switching means 27 allows one to electrically connect the grid 13 to the backing plate or layer 12.

Figure 7:
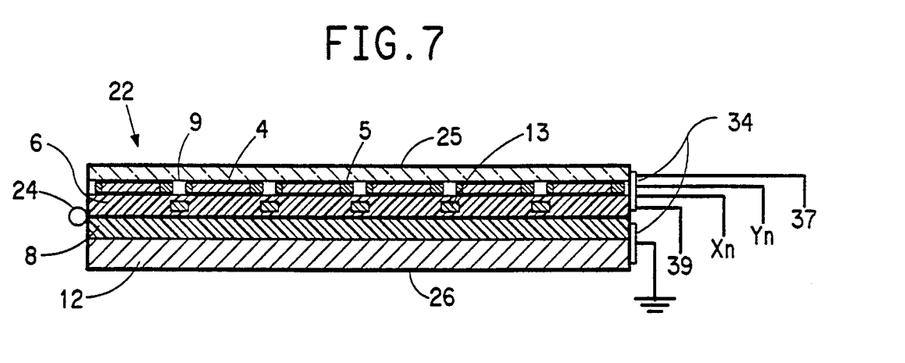
FIG. 7 shows in schematic representation a cassette like device for using an X-ray panel in accordance with this invention for capturing a latent X-ray image.

In use, the device 16, 16' or 16" described may include a cassette or enclosure 22 to shield the element from exposure to actinic radiation, much in the manner a cassette shields an X-ray film. FIG. 7 shows such an arrangement in which a cassette or enclosure 22 is used. The cassette 22 is made of material which is opaque to ambient actinic radiation but transparent to X-rays. Since the ambient levels of gamma radiation are not usually high enough to present any exposure problems, it is not necessary that the material be opaque to gamma radiation. Similarly in the absence of ambient IR radiation, the enclosure 22 need not be opaque thereto.

The enclosure 22 may include a hinge 24 hingedly connecting a top section 25 and a bottom section 26 allowing the cassette 22 to open and close at will. Means 34 are included to allow electrical access to switch contacts for switches 32 and 38, their respective control lines 37 and 39, grid grounding switch 27, and voltage supply line 30.

Figure 8:
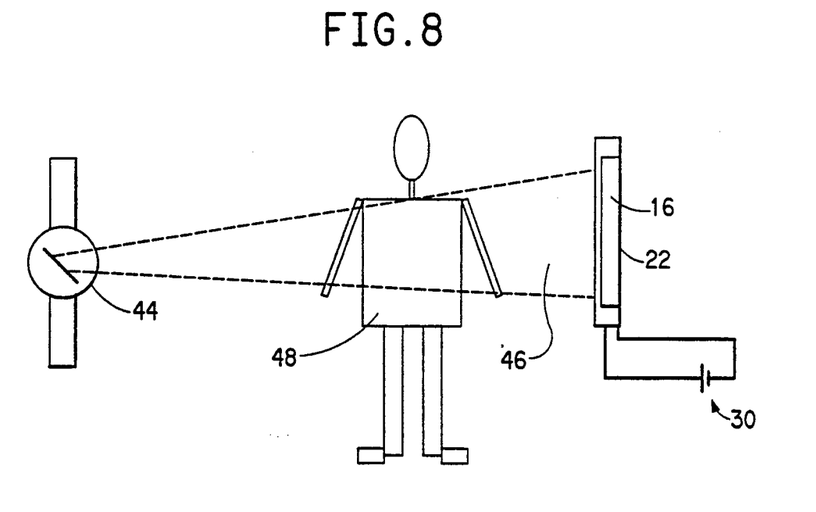
FIG. 8 shows in schematic representation an arrangement for using an X-ray panel in accordance with this invention for capturing a latent X-ray image.

To obtain a latent radiographic image, the element 16, 16' or 16" is placed in the cassette 22. The cassette 22 is placed in the path of information modulated X-ray radiation in a manner similar to the way a traditional cassette-photosensitive film combination is positioned. This arrangement is schematically depicted in FIG. 8 which shows a source of X-ray radiation 44 emitting a beam of X-rays. A target 48, i.e., a patient in the case of medical diagnostic imaging, is placed in the X-ray beam path. The emerging radiation through the patient 48 is intensity modulated because of the different degree of X-ray absorption in the target 48. The modulated X-ray radiation beam 46 is then intercepted by the cassette 22 containing element 16, 16' or 16". X-rays penetrate the enclosure 22 and are eventually absorbed by the photoconductive layer 8.

In operation, first the switches 32 and 38 are all placed in the first position where a trigger voltage is simultaneously applied to all Xn lines and a second charging DC bias voltage 30 is applied to all Yn lines. The first bias voltage triggers the FET transistors 5 which become conductive and the charging voltage appearing on the Yn lines is applied simultaneously to all the outer microplates 4 charging all microcapacitors uniformly across the panel 16, 16' or 16".

The X-ray exposure is next begun and image wise modulated X-ray radiation impinges on the panel 16, 16' or 16". The X-rays generate a flow of electron hole pairs, and electrons migrate and accumulate at the interface between the photoconductive layer 8 and the dielectric layer 6 in the region under the microplates 4.

After a predetermined first time period the X-ray flux is interrupted and X-rays no longer impinge on the element 16, 16' or 16". The application of the bias voltage 30 is then either simultaneously or soon thereafter, but before the element 16, 16' or 16" is exposed to actinic radiation, removed from the element 16, 16' or 16" by switching switches 32 to the second position and removing the trigger voltage from the gates of the FETs 5 thus isolating each microplate 4 from both the charging bias voltage 30 and each other. Switches 38 are also switched over to the second position.

Following removal of the bias charging voltage 30 from the element 16, 16' or 16", the cassette 22 may now be opened. The element 16, 16' or 16" can be handled in the presence of actinic radiation without loss of the stored image information contained in it as a charge distribution in the microcapacitors in the dielectric layer 6 since the microplates 4 are isolated from each other.

Optionally, but preferably at this point, the element 16, 16' or 16" is intentionally exposed to a large dose of actinic radiation, as by a flash exposure, to reduce the charges stored in the photoconductive layer 8 by momentarily rendering such photoconductive layer 8 substantially conductive. The layer 8 behaves as substantially conductive, because the abundant illumination produces an ample supply of electron hole pairs, in effect, neutralizing any charges stored in the photoconductive layer 8. It is readily realized of course that the flash exposure, while preferably done using actinic radiation, can also be performed using additional, unmodulated X-ray radiation.

While exposing the element 16, 16' or 16" to uniform actinic radiation each of the Xn lines is next sequentially addressed by applying a trigger voltage to the line and thus to the gate of the FETs 5 connected to the addressed Xn line. This again renders the FETs 5 conductive and the charges stored in the corresponding microcapacitors flow to the Yn lines. With switches 38 switched over to the second position these charges are applied to the input of charge detectors 36. Charge detectors 36 produce each a voltage output proportional to the charge detected on the line Yn. The output of the charge detectors 36 is next sequentially sampled and amplified in amplifier 41 to obtain an electrical signal representing the charge distribution in the microcapacitors along the addressed Xn line, each microcapacitor representing one image pixel. The next Xn line is then addressed and the process repeated until all the microcapacitors have been sampled and the full image has been read out. The electrical signal output may be stored or displayed or both.

Figure 9:
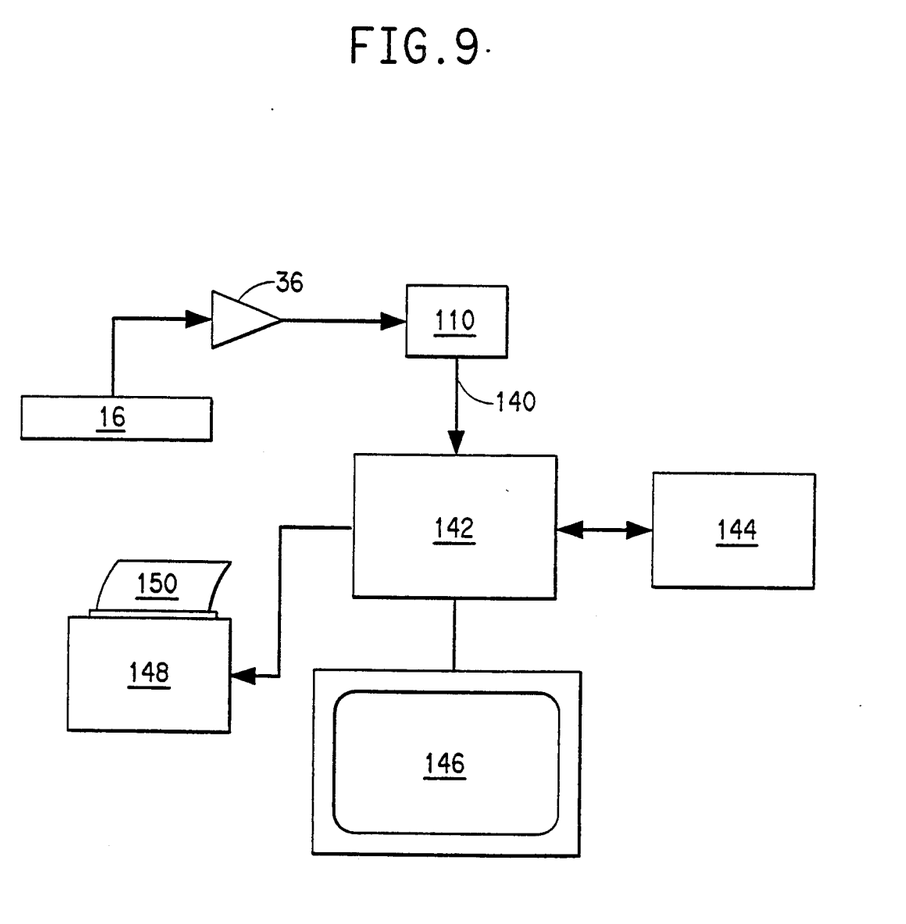
FIG. 9 is a block diagram of an arrangement for the capture and display of a radiogram in accordance with this invention.

The signal obtained from the charge detector 36 is preferably converted to a digital signal in an analog to digital (A/D) converter 110 as shown in FIG. 9. From the A/D converter 110 the signal is directed over line 140 to a computer 142. Computer 142 inter alia directs the signal to appropriate storage means which may be both an internal RAM memory or a long term archival memory 144 or both. In the process, the data representing the radiogram may undergo image processing, such as filtering, contrast enhancement and the like, and it may be displayed on a CRT 146 for immediate viewing or it may be used in a printer 148 to produce a hard copy 150.

After a signal has been recovered, the panel 16, 16' or 16" is cleared of any residual charges by interconnecting all Yn lines and connecting their output to the back panel or layer 12, then again applying a trigger voltage to the Xn lines to render the FET transistors 5 conductive and as a result discharging completely all microcapacitors.

When the element 16' or 16" shown in FIGS. 3 and 5 is used, the process of obtaining an image is similar to the above described process. During the X-ray exposure step, the grid switch 27 is open and the grid 13 is electrically floating. When the readout step occurs, i.e., when the switches 38 are switched over to the second position and the panel 16' or 16" is illuminated with actinic radiation, switch 27 is closed and the grid 13 is connected to the back plate 12. After readout is completed and before the element 16' or 16" is used again for another image capture, the grid 13 connection to the back plate 12 is interrupted and the switches 27 return to a floating state.

The presence of the grid 13 and/or of the inner microplates 4 have an effect in the capture of the radiogram in the form of charge distributions in a plurality of microcapacitors in a structure as herein above described. This effect can be minimized by designing the structure in such a way that the dark decay time constant, the product of pixel capacitance and dark resistivity of selenium, be substantially higher than the X-ray exposure time or the DC biasing time. The presence of this grid 13 does however greatly improve the quality of the output image obtained during readout, as explained below.

A radiographic image is captured in this panel 16, 16' or 16" in the form of stored charges in the microcapacitors formed by the outer microplates 4 and the dielectric and photoconductive layers 6,8 below the outer microplates 4.

Figure 10:
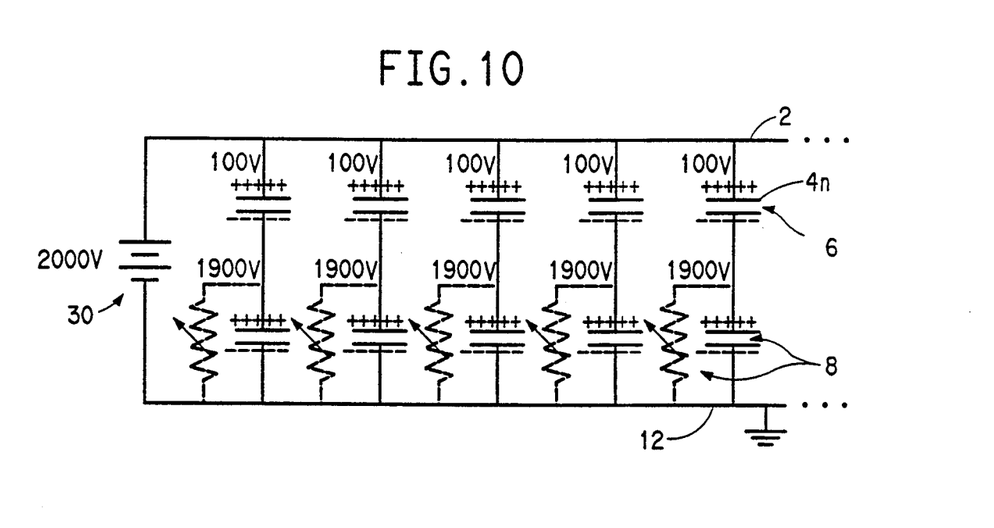
FIG. 10 represents an electrical equivalent of an element in accordance with the present invention prior to exposure to X-ray radiation.

The combination of the dielectric and photoconductive layers 6,8 between the conductive microplates 4 and the backing layer 12, behave as two capacitors in series, one representing the dielectric 6, the other the photoconductor 8 as shown in FIG. 10 which represent an simplified equivalent electric circuit of the combination of the transparent electrode 4, the dielectric 6, the photoconductive 8 and the backing conductive layer 12. In parallel with the photoconductor 8, there is shown a variable resistance in dashed lines representing the effect of the electron hole pair generation in the photoconductive layer 8.

When voltage supply 30 is connected across the element 16, 16' or 16" as shown in FIG. 10, in the absence of actinic or X-ray radiation, the microcapacitors are all charged uniformly the charge being a function of the capacitance of each capacitor. In the present case where all capacitors have the same area plates, the capacitance will depend on the plate separation and dielectric constant of the material between the plates. In the described structure, this will result in two different voltages appearing across the capacitors, one in the microcapacitors representing the photoconductor layer 8, the other microcapacitor representing the dielectric layer 6. If, for instance, the applied voltage difference from the bias source 30 is 2000 Volts, it could be distributed across the two capacitors as 100 volts across the dielectric 6 and 1900 volts across the photoconductor 8.

Figure 11:
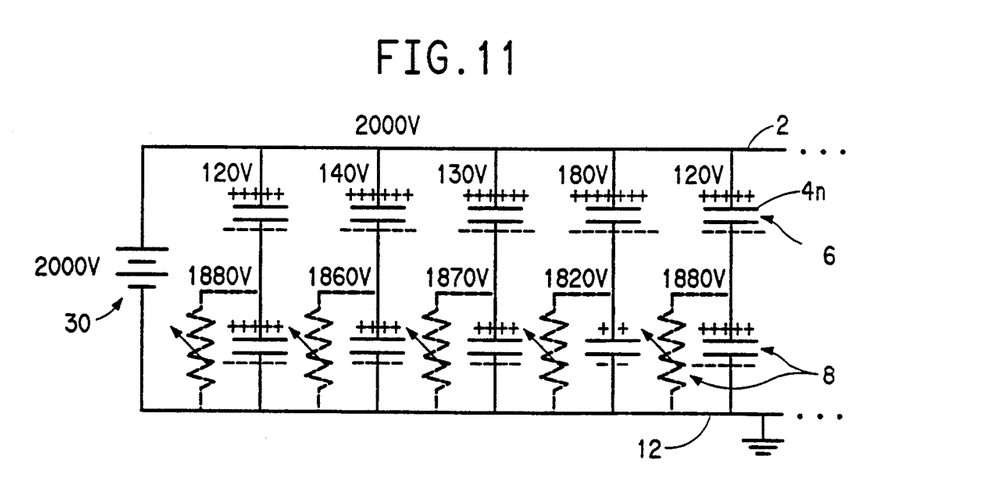
FIG. 11 represents an electrical equivalent of an element in accordance with this invention just after exposure to X-ray radiation.

When the element 16, 16' or 16" is exposed to X-ray radiation, the overall voltage does not change, but because of the generation and movement of electron hole pairs, there is a new charge distribution in each of the microcapacitors, dependent on the radiation intensity incident on each of the microcapacitors, which produces a new voltage distribution between the two series connected microcapacitors. FIG. 11 shows schematically such a hypothetical consequential voltage redistribution.

When the X-ray exposure is terminated, the charges remain trapped in the microcapacitors. The optional charge barrier layer 10 in this case acts to assure that there is no charge leakage to equalize the charges over long periods of time.

Figure 12:
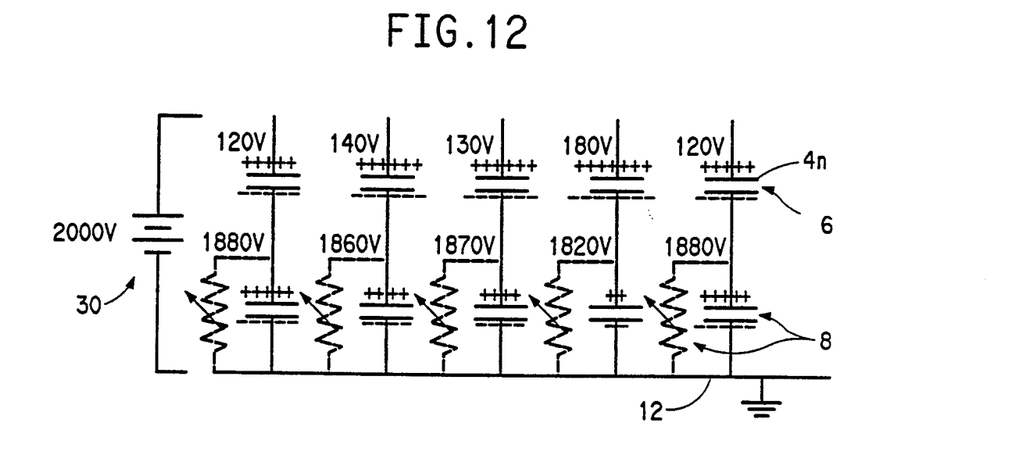
FIG. 12 represents an electrical equivalent of an element in accordance with this invention just after exposure to X-ray radiation and removal of bias voltage.

After termination of the X-ray exposure, the bias at the gates of the FETs 5 is removed by switching switches 32 to the second position removing the source 30 from the element 16, 16' or 16". FIG. 12 shows the voltage distribution at this point. The charges having nowhere to go and remain fixed as they were at the end of the X-ray exposure time period. At this time switches 38 may also be switched over to the second position.

The total voltage appearing across each capacitor pair is still 2000 volts. However, the charges in the dielectric portion 6 of each capacitor are no longer uniform across the full surface of element 16, 16' or 16", but vary representing a latent radiographic image.

Figure 13:
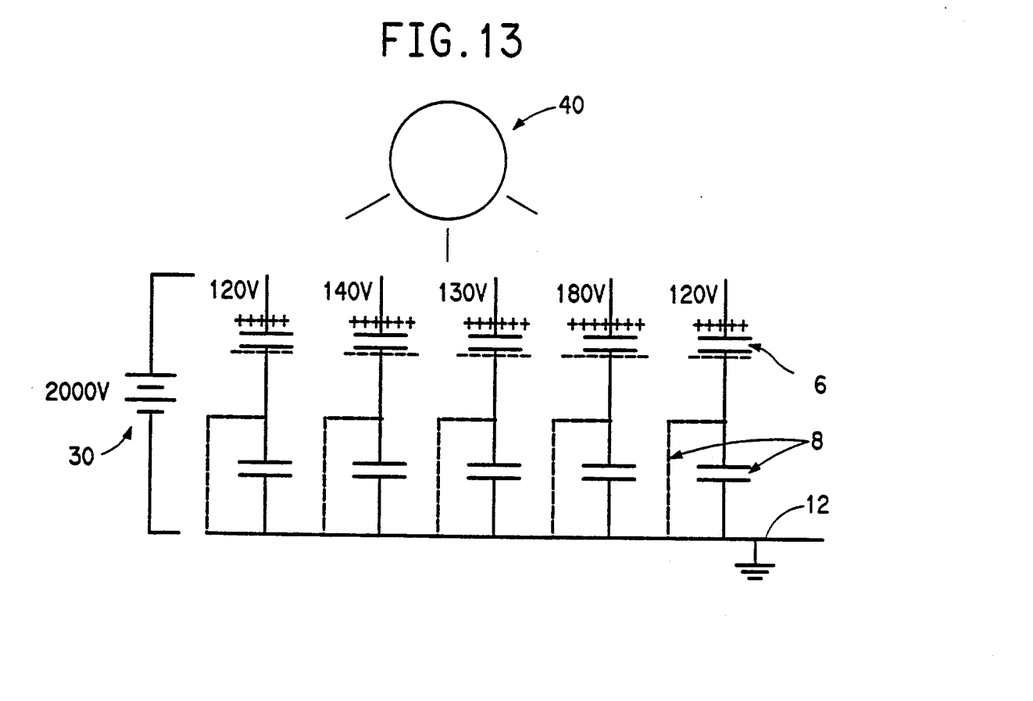
FIG. 13 represents an electrical equivalent of an element in accordance with this invention just after a uniform actinic exposure following exposure to x-ray radiation and removal of a bias source.

If in order to reduce the overall voltage, the optional flash exposure is performed, the results are shown in FIG. 13. The result of such flash exposure is to discharge each of the microcapacitors representing the photoconductive layer 8 in essence bringing one end of each of the dielectric microcapacitors to essentially ground potential. This has the advantage that on readout of the image, which in certain modes entails discharging sequentially each microcapacitor, the potential difference between a fully discharged microcapacitor outer microplate 4 and an adjacent undischarged as yet microcapacitor outer microplate 4 is less than it would be if the flash exposure had not occurred. This in turn results in a lesser chance of undesirable arcing between microcapacitors.

During readout, the panel 16, 16' or 16" is illuminated and the outer microplate 4 is connected to the charge detector 36. In the ideal case, under illumination, the photoconductive layer 8 should behave as a short circuit, in essence making the microcapacitor corresponding to the outer microplate 4, the dielectric layer 6 and the front surface of the photoconductor 8 as the sole capacitor discharging its charge in the charge detector 36. In reality, however, this is not the case. First, the mobility of electrons and holes in the photoconductor 8 is restricted. Furthermore, as the photoconductor 8 thickness is increased to improve its X-ray capturing efficiency, it is less transparent to actinic radiation and, as a result, illumination during the discharge cycle is non uniform in its thickness further making the photoconductive layer 8 behave less as a conductor. Thus, in effect there is still a second capacitor connected in series with the microcapacitor carrying the signal charge to the charge detector 36. This results in a smaller charge delivered to the charge detector 36 as the signal charge redistributes between not only the two capacitors, i.e., the capacitor or the charge detector 36 and the microcapacitor, but between three capacitors, including the one represented by the photoconductive layer 8.

The presence of a grounded grid 13 in effect provides a physically close ground to the signal charge bearing microcapacitor. Under illumination, particularly on the photoconductor front surface, conductivity becomes quite high and serves as a low resistance connection to ground in effect shorting out the photoconductive layer 8 and eliminating the parasitic capacitance. This effect is further enhanced when the inner microplates $7n$ are used, since the conductive inner microplates replace the photoconductor surface in the microcapacitor, further reducing the resistivity of the path between microcapacitor plate and ground.

The examples and suggested systems illustrated and discussed in this specification are intended only to teach those skilled in the art the best way known to the inventors to make and use their invention. Thus, the specific embodiments of this specification should be considered as illustrative rather than limiting the scope of the present invention. Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. An X-ray image capture element, comprising:
a first, electrically conductive backing layer;
a second, photoconductive layer responsive to both actinic and X-ray radiation extending substantially over said backing layer, the photoconductor layer having a back surface in contact with said backing layer and a front surface opposite said back surface;
a third, dielectric layer substantially transparent to both actinic and X-ray radiation, the dielectric layer also having a back surface and a front surface, the dielectric back surface extending substantially over and in contact with said front surface of the photoconductive layer;
a plurality of discrete conductive outer microplates substantially transparent to both actinic and X-ray radiation, said outer microplates arranged on said front surface of the dielectric layer with a space between adjacent microplates, each of said outer microplates having dimensions coextensive with a minimum resolvable picture element;
a first plurality of discrete conductive Xn address lines extending along the outer microplates;
a second plurality of discrete conductive Yn sense lines extending along said outer microplates in a direction across said Xn address lines; and
each outer microplate being connected to one adjacent of said plurality of the Xn address and Yn sense lines via at least one transistor.

2. The element in accordance with claim 1, further comprising a conductive grid under the dielectric layer extending over the front surface of the photoconductive layer aligned in the spaces outside the areas covered by the outer microplates, generally under the Xn and Yn lines, and in contact with the front surface of the photoconductive layer.

3. The element in accordance with claim 2, further comprising a plurality of discrete conductive inner microplates substantially transparent to both actinic and X-ray radiation, said plurality of inner microplates arranged on said front surface of the photoconductive layer and in contact therewith, each of said inner microplates also having dimensions coextensive with a minimum resolvable picture element, the inner microplates aligned substantially underneath the outer microplates.

4. The element in accordance with any one of claims 1, 2 or 3, wherein each of the transistors comprises an FET transistor having a source, a gate and a drain, and the source is connected to one of the microplates, the drain to one of the Yn sense lines and the gate to one of the Xn address lines.

5. The element in accordance with claim 2 or 3, further comprising means to contact the grid from outside said element.

6. The element in accordance with any one of claims 1, 2 or 3, further comprising a charge barrier layer extending between the photoconductive layer and the backing layer.

7. The element in accordance with any one of claims 1, 2 or 3, wherein the conductive layer comprises aluminum and the photoconductive layer is over an aluminum oxide layer which substantially covers a surface of the conductive layer.

8. The element in accordance with any one of claims 1, 2 or 3, further comprising means for switching said plurality of Xn and Yn lines each from a first charge state to a second readout state.

9. A method for capturing a radiogram on an X-ray image capture element, comprising:
a first, electrically conductive, backing layer;
a second, photoconductive layer responsive to both actinic and X-ray radiation extending substantially over said backing layer;
a third, dielectric layer substantially transparent to both actinic and X-ray radiation, the dielectric layer having a back surface extending substantially over and in contact with said photoconductive layer and a front surface;
a plurality of discrete conductive outer microplates substantially transparent to both actinic and X-ray radiation, said microplates arranged on said front surface with a space between adjacent microplates, each of said microplates having dimensions coextensive with a minimum resolvable picture element, the microplates, dielectric layer, photoconductive layer and backing layer forming a plurality of microcapacitors;
a first plurality of discrete conductive Xn address lines extending along the microplates;
a second plurality of discrete conductive Yn sense lines extending along said microplates in a direction across said Xn address lines; and
each microplate being connected to one adjacent of said plurality of said Xn and Yn lines via a transistor, the method comprising:
(a) preventing actinic radiation from impinging on said element;
(b) switching the pluralities of Xn and Yn lines to a first charging position and applying a bias voltage through the transistors simultaneously to all the microplates to develop an electric potential difference between said plurality of discrete conductive microplates and said backing layer;
(c) impinging imagewise modulated X-ray radiation for a first time period onto the element;
(d) after the first time period, stopping the applying of the bias voltage to trap in the microcapacitors electrical charges proportional to the intensity of the impinging radiation on the microplates;
(e) switching the plurality of the Xn and Yn lines to a second readout position;
(f) optionally exposing the element to uniform radiation for a second time period;
(g) while exposing the element to actinic radiation, addressing one of said plurality of Xn lines with a trigger voltage to switch to a conductive state the transistors connecting the addressed Xn line to a subset of the microplates and to connect said subset of the microplates to the Yn lines;
(h) sequentially detecting an output signal for each microplate connected to said plurality of Yn sense lines; and
(i) repeating steps (g) and (h) for each of said plurality of Xn or Yn address lines until all signals from all microplates have been detected.

10. The method in accordance with claim 9, further comprising:
(j) electrically interconnecting all Xn address lines and all Yn sense lines; and (k) while applying a bias voltage to the Xn address lines, flooding the element with actinic radiation and connecting the output of the Yn sense lines to the backing layer.

11. The method for capturing a radiogram on an X-ray image capture element in accordance with claim 9 or 10, wherein the X-ray capture element further comprises a conductive grid under the dielectric layer extending over a front surface of the photoconductive layer aligned in the spaces outside areas covered by the outer microplates, generally under the plurality of Xn and Yn lines, and in contact with the surface of the photoconductive layer and wherein following step (e) the conductive grid is electrically connected to the first electrically conductive backing layer.

12. The method for capturing a radiogram on an X-ray image capture element in accordance with claim 9 or 10, wherein the X-ray capture element further comprises a plurality of inner microplates under the dielectric layer on the photoconductive layer and in contact therewith, aligned substantially under the plurality of outer microplates, and a conductive grid also under the dielectric layer extending in the spaces between the inner microplates, generally under the plurality of Xn and Yn lines, and also in contact with the photoconductive layer, and wherein following step (e) the conductive grid is electrically connected to the first electrically conductive backing layer.

* * * * *